(12) United States Patent
Otake et al.

(10) Patent No.: US 12,005,996 B2
(45) Date of Patent: Jun. 11, 2024

(54) RAIN-GUARD DEVICE FOR SHIPPING

(71) Applicant: IHI Transport Machinery Co., Ltd, Tokyo (JP)

(72) Inventors: Yasuhiro Otake, Tokyo (JP); Shuhei Kinugawa, Tokyo (JP)

(73) Assignee: IHI TRANSPORT MACHINERY CO., LTD, Tokyo (JP)

( * ) Notice: Subject to any disclaimer, the term of this patent is extended or adjusted under 35 U.S.C. 154(b) by 227 days.

(21) Appl. No.: 17/636,226

(22) PCT Filed: Aug. 28, 2020

(86) PCT No.: PCT/JP2020/032702
§ 371 (c)(1),
(2) Date: Feb. 17, 2022

(87) PCT Pub. No.: WO2021/059868
PCT Pub. Date: Apr. 1, 2021

(65) Prior Publication Data
US 2022/0332391 A1    Oct. 20, 2022

(30) Foreign Application Priority Data
Sep. 24, 2019    (JP) ................. 2019-173067

(51) Int. Cl.
*B63B 19/18*    (2006.01)

(52) U.S. Cl.
CPC .................. *B63B 19/18* (2013.01)

(58) Field of Classification Search
CPC ......... B63B 19/00; B63B 19/12; B63B 19/14; B63B 19/18; B63B 19/26; B63B 19/28; B63B 27/00; B63B 27/28; B65G 63/00
(Continued)

(56) References Cited

U.S. PATENT DOCUMENTS 3,800,723 A * 4/1974 Collins .................. B63B 19/16
114/69
4,237,809 A * 12/1980 Hickmann .............. B63B 19/18
114/361
(Continued)

FOREIGN PATENT DOCUMENTS

CN    200971153 Y    11/2007
CN    202414106 U    9/2012
(Continued)

OTHER PUBLICATIONS

Notice of the First Office Action issued for Chinese Patent Application No. 2020800525840, dated Apr. 19, 2023 and its English translation.
(Continued)

*Primary Examiner* — Daniel V Venne
(74) *Attorney, Agent, or Firm* — McCormick, Paulding & Huber, PLLC

(57) ABSTRACT

A rain-guard device for shipping is provided that can restrain water from seeping from an end part of the lid member. A rain-guard device for shipping 20 includes a rail 19, which is placed on a sliding hatch cover 11, an on-board chute 22, which is provided in the rail 19 in a travelable manner, which covers part of a hatch opening 13, and which, furthermore, supplies cargo from a shiploader 1 into the hold 7, and a lid member 23 to cover the rest of the hatch opening 13. The lid member 23 is formed in an arch shape in cross section. A waterproof seal 92 for restraining water from seeping into the lid member 23 is provided at an end part of the lid member 23 opposite to the ship chute 22 among end parts of the lid member 23.

7 Claims, 10 Drawing Sheets

(58) Field of Classification Search
USPC .................................... 114/201 R, 202, 361
See application file for complete search history.

(56) References Cited

U.S. PATENT DOCUMENTS

| | | | |
|---|---|---|---|
| 5,931,111 A | 8/1999 | Shields et al. | |
| 7,966,960 B2 * | 6/2011 | Linares .................. | B63B 19/18 114/201 R |
| 8,490,560 B2 * | 7/2013 | Walker .................... | B63B 17/02 114/202 |
| 8,818,586 B2 | 8/2014 | Pereira | |

FOREIGN PATENT DOCUMENTS

| | | |
|---|---|---|
| CN | 103391878 A | 11/2013 |
| CN | 103612719 A | 3/2014 |
| CN | 104229096 A | 12/2014 |
| CN | 206317972 U | 7/2017 |
| CN | 206336400 U | 7/2017 |
| CN | 107554699 A | 1/2018 |
| JP | H0532284 U | 4/1993 |
| JP | 06271087 A | 9/1994 |
| JP | 3179239 B2 | 6/2001 |
| JP | 2003517390 A | 5/2003 |
| JP | 2013144529 A | 7/2013 |
| JP | 2019085236 A | 6/2019 |
| TW | 396130 B | 7/2000 |

OTHER PUBLICATIONS

International Search Report for PCT/JP2020/032702 dated Oct. 20, 2020.

* cited by examiner

RAIN-GUARD DEVICE FOR SHIPPING

CROSS-REFERENCE TO RELATED APPLICATIONS

This application is a National Stage application of International Patent Application No. PCT/JP2020/032702, filed on Aug. 28, 2020, which claims priority to Japanese Patent Application No. 2019-173067 filed on Sep. 24, 2019, each of which is hereby incorporated by reference in its entirety.

BACKGROUND

Technical Field

The present disclosure relates to a rain-guard device for shipping, which, when loading cargo such as grains or the like on a ship with a shiploader, prevents the cargo from getting wet from rainfall, and prevents the cargo being loaded from scattering by the wind.

Background Art

As devices for preventing cargo being loaded from getting wet from rainfall, those described in Japanese Patent Publication No. 3179239 and U.S. Pat. No. 8,818,586 Specification are known.

With the device described in Japanese Patent Publication No. 3179239, a building is constructed on the quay, and an overhanging roof is provided for this building.

Also, the device described in U.S. Pat. No. 8,818,586 Specification covers a hatch with a film that hangs from a shiploader.

However, the device described in Japanese Patent Publication No. 3179239 is problematic in that it is difficult to cope with large vessels, and, furthermore, the cost of installation is high.

Also, the device described in U.S. Pat. No. 8,818,586 Specification is comprised of many pieces of equipment, and therefore is problematic in that its control is complex and expensive, and in that, furthermore, the shiploader also has to be modified in many ways, which entails high costs of modifications.

SUMMARY

So, the following rain-guard device for shipping may be a possible solution to these problems. This rain-guard device for shipping has a pair of rails, which are placed on sliding hatch covers on both sides of a hatch opening, an on-board chute, which is placed across these rails, and an expandable and contractable lid member, which closes the part of the hatch opening that is not covered by the on-board chute.

Such a rain-guard device for shipping can be applied to large vessels, and can be provided at low cost.

However, the lid member is configured by stretching a water-stop sheet between archshaped arch frames straddling the rails, and an end part is open. Therefore, it is conceivable that rainwater may seep into a hatch opening from the open end part.

So, the present disclosure has been made in view of the above circumstances, and it is an object of the present disclosure to provide a rain-guard device for shipping that can restrain water from seeping from an end part of the lid member.

According to one aspect of the present disclosure, a rain-guard device for shipping is provided, which includes a rail, which is placed on a sliding hatch cover that opens and closes an upper opening of a hold, an on-board chute, which is provided in the rail in a travelable manner, which covers part of a hatch opening that is formed when the sliding hatch cover opens, and which, furthermore, supplies cargo from a shiploader into the hold, and a lid member, which is placed in both front and rear in a traveling direction of the on-board chute, and which is configured to expand and contract as the on-board chute travels, in order to cover the rest of the hatch opening. The lid member is formed in an arch shape in cross section. A waterproof seal for restraining water from seeping into the lid member is provided at an end part of the lid member opposite to the ship chute among end parts of the lid member.

Preferably, the waterproof seal includes a waterproof plate that closes an upper part of an end face opening of the lid member, and a waterproof sheet that closes the end face opening below the waterproof plate.

Preferably, the waterproof sheet extends downward from the rail so as to cover a side opening between the sliding hatch covers.

Preferably, the waterproof seal is arranged at a position where the waterproof seal is covered from above by the water-stop sheet.

According to the present disclosure, it is possible to restrain water from seeping from an end part of the lid member.

DETAILED DESCRIPTION

Figure 1:
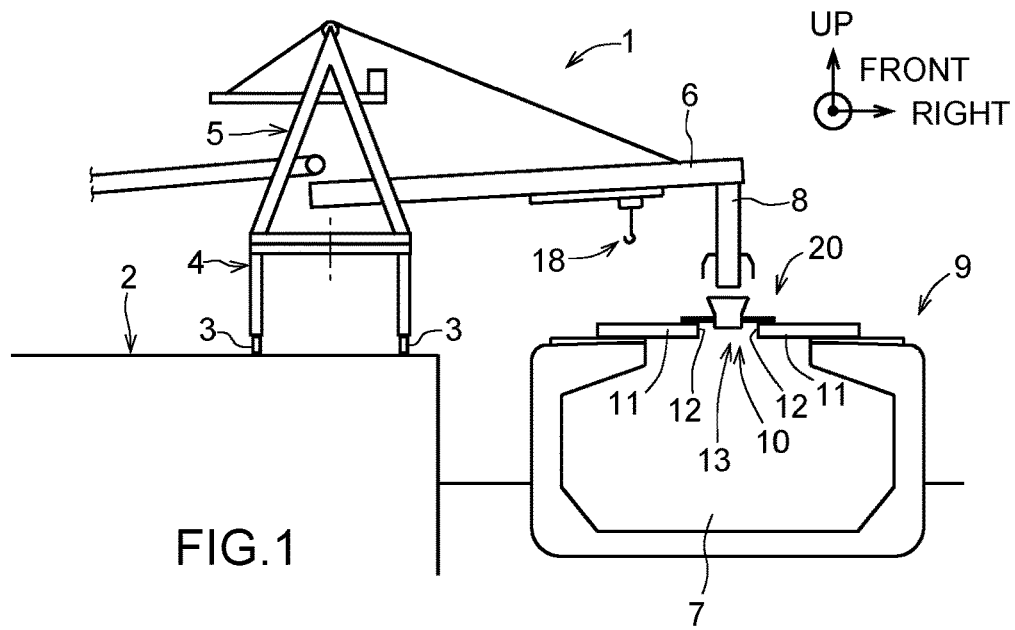
FIG. 1 is a schematic front view of a rain-guard device for shipping according to an embodiment of the present disclosure.
Figure 2:
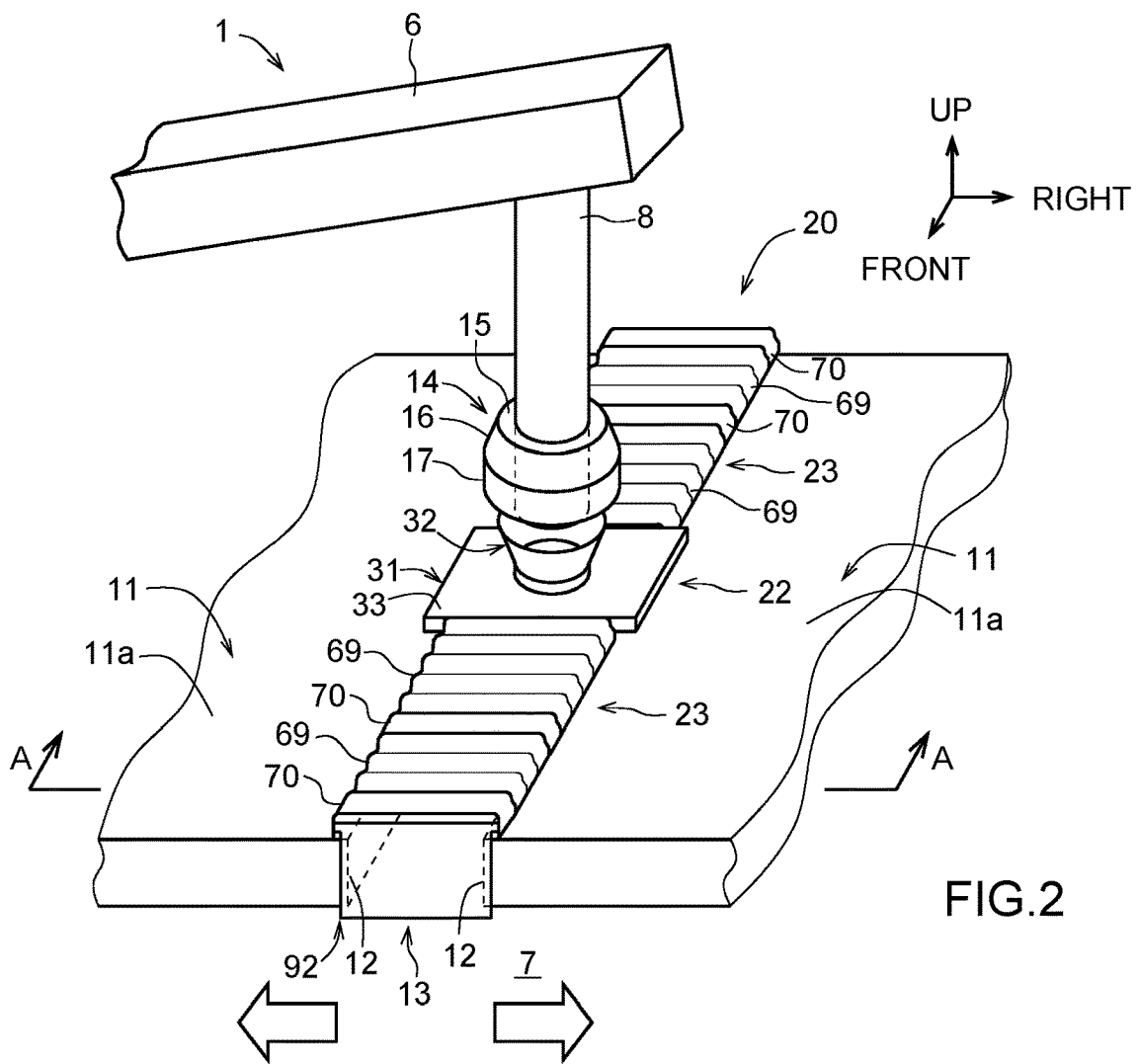
FIG. 2 is a perspective view of a main part of FIG. 1.
Figure 3:
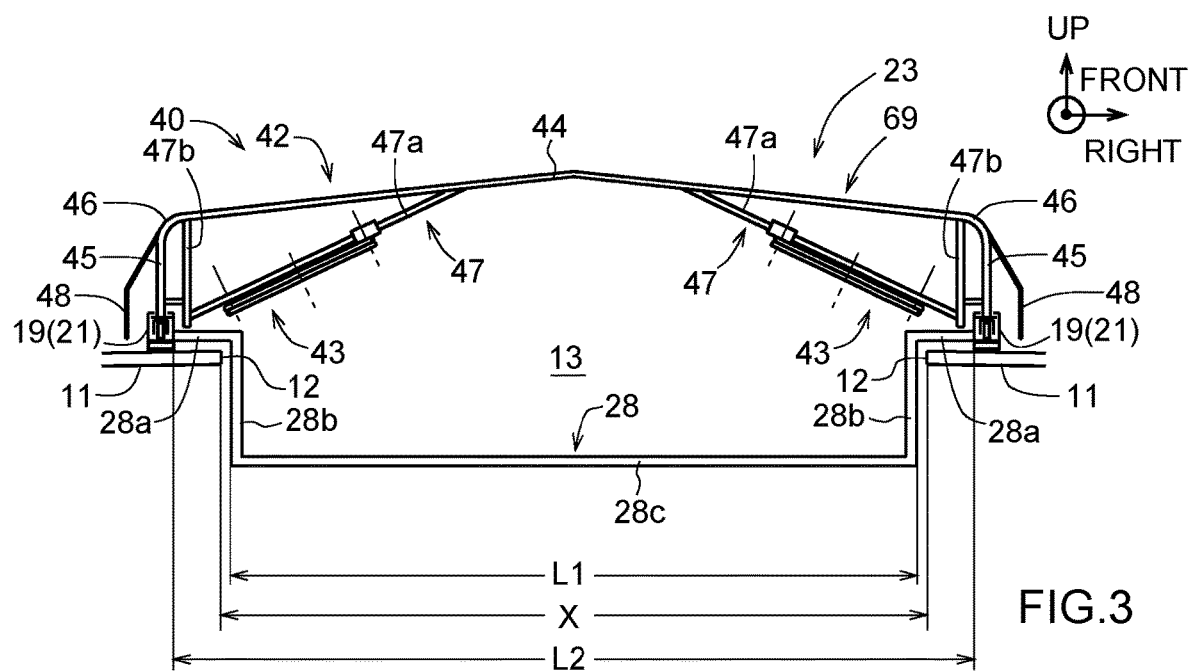
FIG. 3 is a cross-sectional view taken along line A-A in FIG. 2.

Now, embodiments of the present disclosure will be described below with reference to the accompanying drawings. FIG. 1 is a schematic front view of a shiploader, a vessel, and a rain-guard device for shipping according to the present embodiment. FIG. 2 is a schematic perspective view of a rain-guard device for shipping as set on a vessel, seen from a high oblique angle. FIG. 3 is a front view of a lid member. Note that, for ease of description, with the present embodiment, the directions along which the sliding hatch covers open and close are left and right directions, and directions that are horizontal and at right angles to these left and right directions are front and rear directions.

First, the shiploader and the vessel will be described.

As shown in FIG. 1, a shiploader 1 has a traveling part 4, which travels on a rail 3 laid on the quay 2, a rotating part 5, which is provided on the traveling part 4 in a rotatable manner, a boom 6, which is provided on the rotating part 5 so as to be raised and lowered freely, and a chute part 8, which hangs from the tip of the boom 6, and which supplies cargo such as grains or the like into a hold 7. The boom 6 is provided with a conveyor (not shown) for transporting the cargo from the quay 2 to the chute part 8. Note that the cargo is not limited to grains. The cargo may be other bulk materials that are preferred not to get wet in the rain.

Also, the shiploader 1 is provided with an unloading device 18, which lifts the rail units 30 (see FIG. 13), the chute unit 58 (see FIG. 15) and so on, which will be described later, so as to move up and down freely. The unloading device 18 is comprised of a hoist, and provided in the boom 6 of the shiploader 1.

The vessel 9 is a cargo ship. The vessel 9 has a hold 7 with an upper opening 10, and sliding hatch covers 11, which open and close the upper opening 10. A pair of sliding hatch covers 11 are provided opposite each other on both the left and right sides of the vessel 9, and, furthermore, provided so as to be slidable in left and right directions (directions along the vessel's width). That is, the sliding hatch covers 11 are designed to open left and right, and the upper opening 10 closes as the opposing ends 12 press against each other, and the upper opening 10 opens as the opposing ends 12 part from each other.

Also, the sliding hatch covers 11 are formed so as to open up the upper opening 10 at an arbitrary distance. In the following description, an opening will be formed between the sliding hatch covers 11 when the sliding hatch covers 11 open, and this opening, viewed from above, will be referred to as "hatch opening 13". Note that the sliding hatch covers 11 may be provided so as to be slidable in front and rear directions with respect to the vessel 9.

Next, the rain-guard device for shipping according to the present embodiment will be described.

Figure 4:
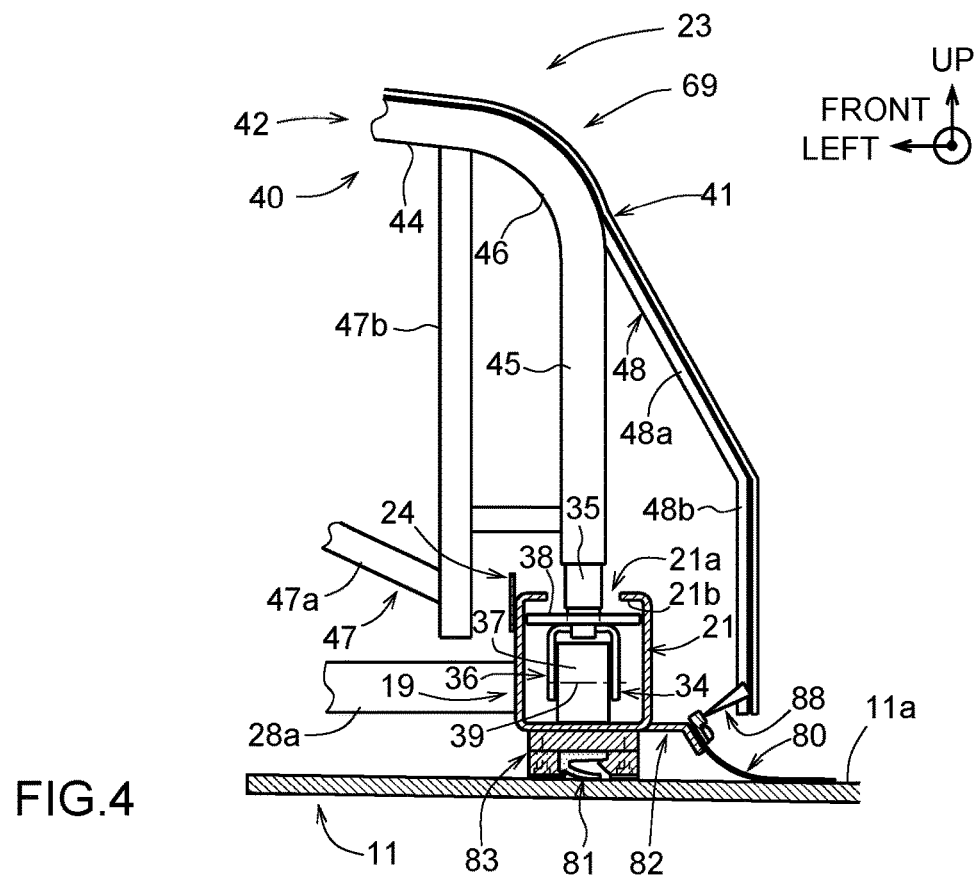
FIG. 4 is an enlarged view of a main part of FIG. 3.

As shown in FIG. 2, FIG. 3 and FIG. 4, the rain-guard device for shipping 20 has rails 19, which are placed on the sliding hatch covers 11, an on-board chute 22, which is provided on the rails 19 in a travelable manner, and which covers part of the hatch opening 13, and lid members 23, which cover the rest of the hatch opening 13.

The rails 19 are placed on the left and right sliding hatch covers 11 in parallel, to extend in front and rear directions. Also, the rails 19 are made up by joining a plurality of rail pieces 21, which are shorter than the front-to-rear dimension of the hatch opening 13, along the longitudinal directions (front and rear directions). The length of the rails 19 are set to be substantially the same as the front-to-rear length of the hatch opening 13 when a predetermined number of (for example, five) rail pieces 21 are joined. Note that the rails 19 do not have to be a joint structure. In this case, a rail 19 may be comprised of one rail piece 21, and the length of a rail piece 21 may be set to be substantially the same as the length of the hatch opening 13.

Each rail piece 21 is formed in a rectangular frame shape in cross section, and, furthermore, has a slit 21a, which extends in the longitudinal direction, in the upper surface. The slit 21a is formed at the center in the widthwise direction of the rail piece 21.

Also, in each rail piece 21, a guard member 24 for preventing water from seeping into the hatch opening 13 is provided along the longitudinal direction of the rail piece 21, over its entire length. The guard member 24 is formed in a plate shape, and is provided on the side surface of each rail piece 21 on the hatch opening 13, so as to stick out upward.

Figure 13:
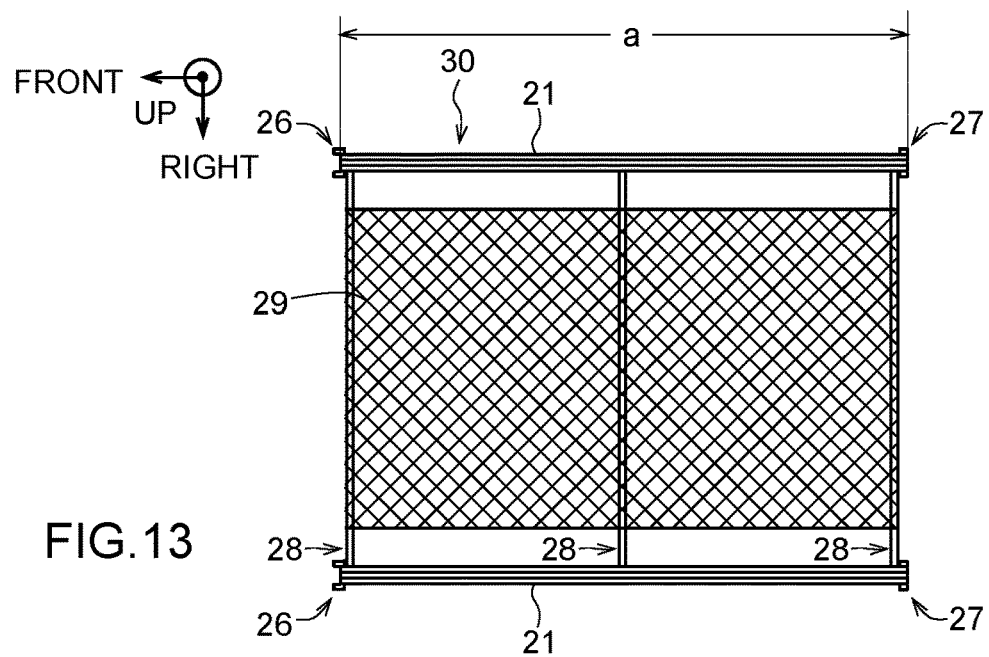
FIG. 13 is a top view of a rail unit.
Figure 14:
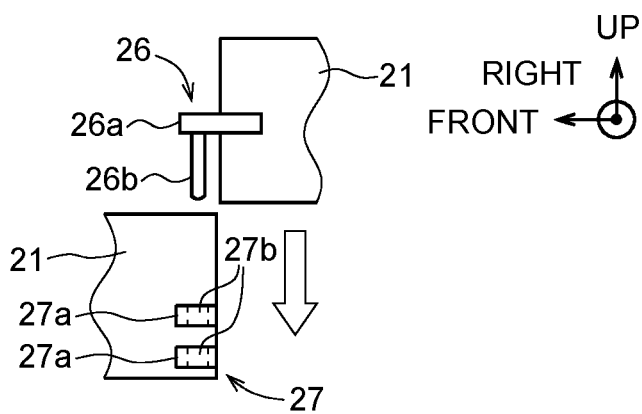
FIG. 14 is an enlarged view of a joining part of a chute unit and a rail unit.

Also, as shown in FIG. 13 and FIG. 14, a male joining piece 26 for joining rail pieces 21 with one another is provided in one end part of each rail piece 21, and a female joining pieces 27 to be joined with a male joining piece 26 in a disengageable manner is provided in the other end part. The male joining piece 26 is provided on both the left and right sides of one end part of each rail piece 21, and has an extending part 26a, which extends from one end of the rail piece 21, and a joining pin 26b, which is provided in the tip part of the extending part 26a and extends downward. The female joining piece 27 has receiving parts 27a, which are provided on both the left and right sides of the other end part of the rail piece 21, and insertion holes 27b, which are provided in the receiving parts 27a to extend upward and downward, and in which joining pins 26b are to be inserted. The receiving parts 27a are formed in the shape of a flat plate, and, furthermore, formed in two, upper and lower steps. Note that, in addition to this method of connecting the rail pieces 21 using the connecting pins 26b, a method of providing buckles or the like on each rail piece 21 and connecting the rail pieces 21 with one another may be used.

Figure 9:
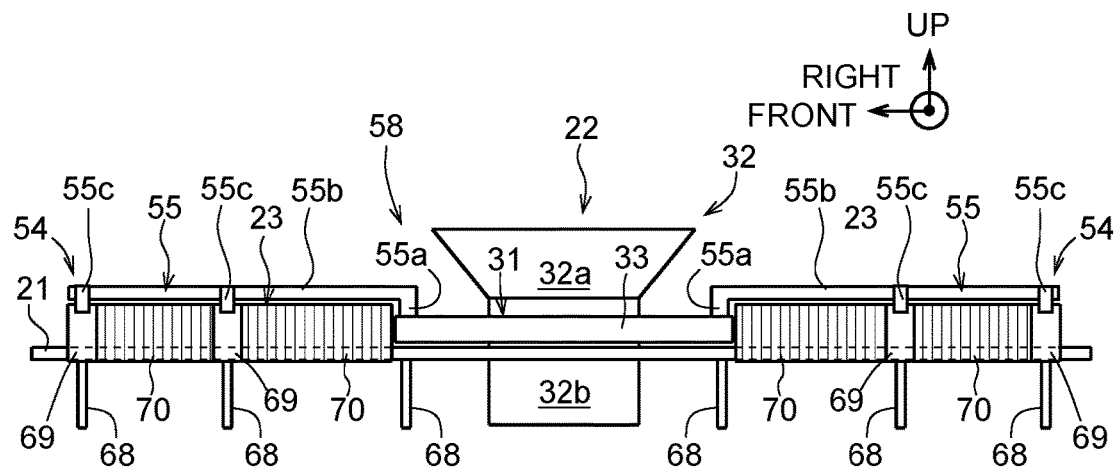
FIG. 9 is a side view of a chute unit.

As shown in FIG. 2 and FIG. 9, the on-board chute 22 has a traveling part 31, which is provided on rail pieces 21 in a travelable manner, and a chute body part 32 for supplying cargo from the shiploader 1 into the hold 7.

The traveling part 31 has a traveling base part 33, which is formed in a plate shape, and a plurality of fixed casters 34 (see FIG. 4), which are provided in the traveling base part 33. The traveling base part 33 is formed in a rectangular shape when seen from above. The fixed casters 34 are the same as those of the lid members 23, which will be described later. A fixed caster 34 has a leg part 35, which is fixed to the traveling base part 33 and extends downward, a shaft support part 36, which is provided at the lower end of the leg part 35, a wheel 37, which is provided in the shaft support part 36 in a rotatable manner, and a retainer 38, which is provided in the leg part 35. The leg part 35 is formed in a rod-like shape, with a round cross section. Also, the leg part 35 is inserted in the slit 21a of the rail piece 21. The shaft support part 36 is placed in the rail piece 21 and is formed in a bifurcated shape. An axle 39 is provided in the shaft support part 36. The wheel 37 is provided in the axle 39 in a rotatable manner. The retainer 38 is formed in a plate shape that is wider than the slit 21a, and configured to interfere with the ceiling surface 21b of the rail piece 21 when moved upward.

Figure 8:
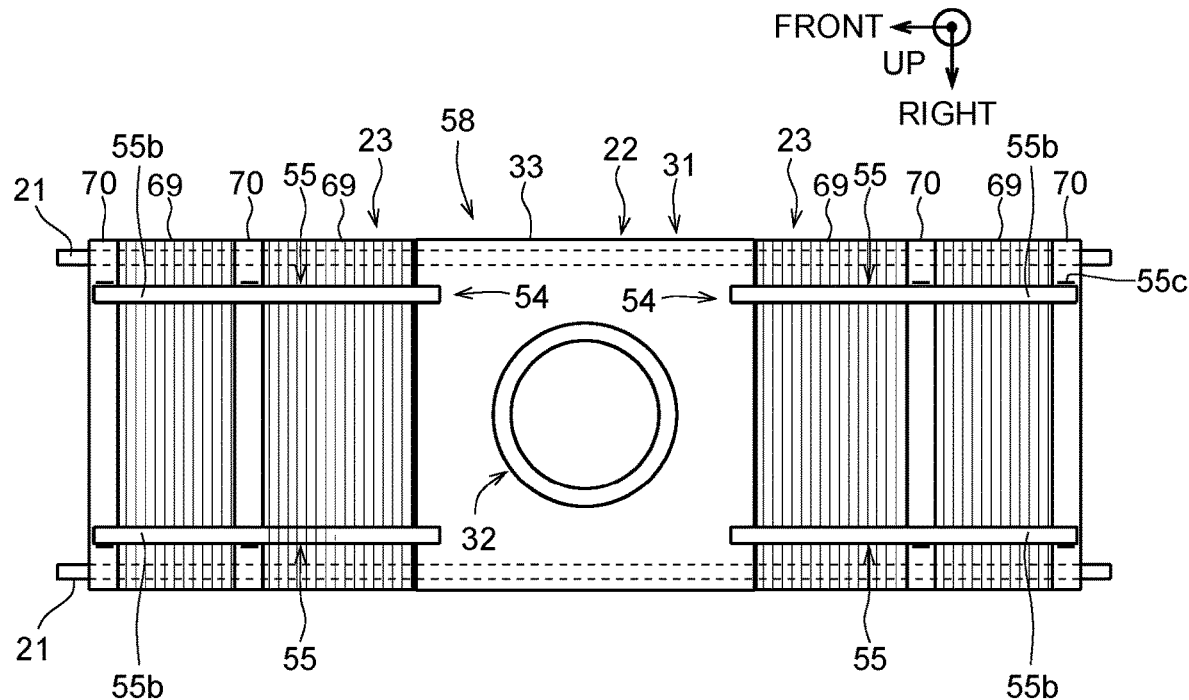
FIG. 8 is a top view of a chute unit.

As shown in FIG. 8 and FIG. 9, a chute body part 32 is placed at the center of the traveling base part 33 in front and rear, and left and right directions. The chute body part 32 is formed in a cylindrical shape, extending in the vertical direction. The chute body part 32 has a tapered pipe part 32a, which is formed in an upper part of the chute body part 32 and increases in diameter as it goes upward, and a straight pipe part 32b, which is connected to the lower end of the tapered pipe part 32a and extends vertically.

Also, as shown in FIG. 2, a cover member 14 to cover the tapered pipe part 32a from above is provided in the chute part 8 of the shiploader 1. The cover member 14 is made of metal. The cover member 14 has a top plate part 15, which extends radially outward from the outer periphery of the chute part 8, an inclined plate part 16, which increases in diameter as it extends downward from the outer peripheral end of the top plate part 15, and a side plate part 17 of a cylindrical shape, which extends downward from the lower end of the inclined plate part 16. The top plate part 15 is formed in an annular shape, the inner peripheral end of the top plate part 15 is connected with the outer periphery of the chute part 8, over the entire circumference, in a liquid-tight manner, by means of welding or the like.

By this means, the top plate part 15 can block the rainwater that flows down along the chute part 8, and the cargo that is discharged from the chute part 8 can be prevented or restrained from getting wet. The side plate part 17 is formed larger in diameter than the tapered pipe part 32a, and covers the outer periphery of the tapered pipe part 32a. By this means, the side plate part 17 can prevent or restrain the rainfall from catching the wind and finding its way into the tapered pipe part 32a from the side. Also, when the human body or the like hit from the side, the inclined plate part 16 and the side plate part 17 catch the human body or the like with their planes to protect the human body or the like.

Note that the cover member 14 may be made of relatively hard materials other than metal. The cover member 14 may be made of materials for structures such as glass fiber, reinforced plastic and so forth.

The lid members 23 are formed so as to expand and contract in front and rear directions, and placed in front and rear of the on-board chute 22. To be more specific, one end of each lid member 23 in front and rear directions is fixed to the on-board chute 22.

The other end of each lid member 23 with respect to front and rear directions is fixed to a rail 19 (see FIG. 3) near an end part of the hatch opening 13, in a detachable manner. This allows the lid members 23 to expand and contract as the on-board chute 22 travels. For example, when the on-board chute 22 travels forward, the lid member 23 on the front side of the on-board chute 22 is retracted forward, and the lid member 23 on the rear side of the on-board chute 22 expands forward. Note that, when the rail 19 is not a joint structure, the other end of the lid member 23 may be fixed to the rail 19 in an unremovable manner.

As shown in FIG. 2, each lid member 23 has a plurality of bellows parts 69, which are expandable and contractable in front and rear directions, and bellows support parts 70 that support the bellows parts 69.

As shown in FIG. 3 and FIG. 4, each bellows part 69 has a frame structure 40, which is formed to be expandable and contractable in front and rear directions, and a first water-stop sheet 41, which is provided on the frame structure 40.

The frame structure 40 has a plurality of first arch frames 42, which are formed in an arch-shape across left and right rail pieces 21, and telescopic links 43, which join the first arch frames 42 with one another so that these arch frames 42 can be close to or distant from each other in front and rear directions.

Each first arch frame 42 is formed round in cross section. By this means, the water-stop sheet 41 in contact with the first arch frame 42 is prevented or restrained from being damaged.

Furthermore, each first arch frame 42 has a center frame part 44, which is formed in the center in left and right directions, and which extends along left and right directions, rising frame parts 45, which are formed in both the left and right end parts and extend in vertical directions, arc-shaped frame parts 46, which are formed in an arc shape and connect between the center frame part 44 and the rising frame parts 45, and link receiving frame parts 47, which are coupled with the telescopic links 43.

The back surface of the first water-stop sheet 41 is fixed to the center frame part 44. A fixed caster 34, which has been described earlier, is provided at the lower end of each rising frame part 45. Furthermore, in each rising frame part 45, a guide frame 48, which guides the first water-stop sheet 41 that hangs down from the arc-shaped frame part 46 outwardly (in the direction to part from the hatch opening 13), is provided. The guide frame 48 is formed to have a round cross section. The guide frame 48 has an inclined guide part 48a, which extends outward and obliquely downward from an upper part of the rising frame part 45, and a vertical guide part 48b, which extends vertically downward from the lower end of the inclined guide part 48a. The lowermost position of the vertical guide part 48b is set to substantially the same height as the lowermost position of the rail piece 21. The first water-stop sheet 41 is fastened to the lower end of the vertical guide part 48b.

The link receiving frame parts 47 are provided symmetrically with respect to the center of the center frame part 44 in left and right directions. To be more specific, each link receiving frame part 47 has a slide guide part 47a, which is inclined and extends obliquely downward from the center part in left and right directions, toward the outside in left and right directions, and a support frame part 47b, which is provided in either the left or the right end part of the center frame part 44, and which extends downward and connects with the tip of the slide guide part 47a.

Figure 6:
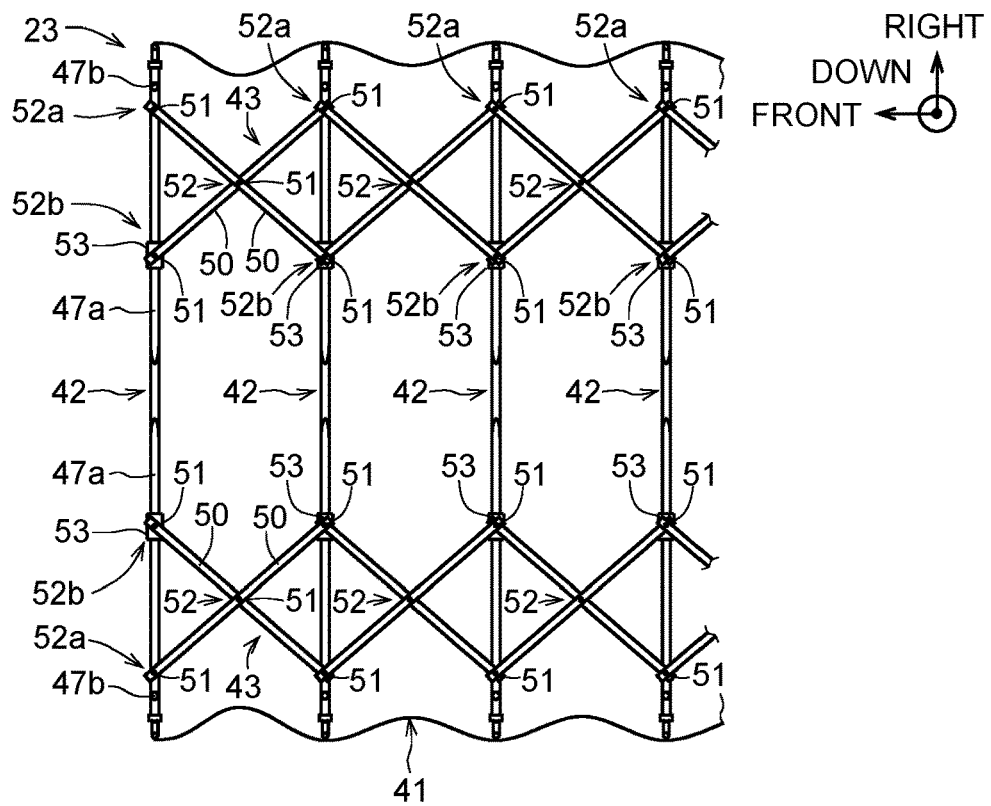
FIG. 6 is a bottom view of a lid member.
Figure 7:
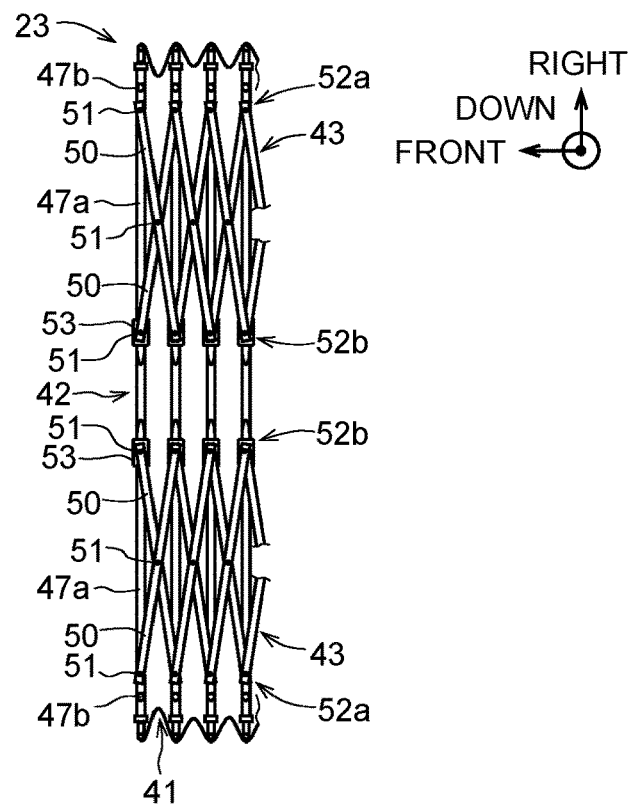
FIG. 7 is a bottom view of a lid member as contracted.

As shown in FIG. 6 and FIG. 7, each telescopic link 43 is made up by joining a plurality of crossing members 52, each formed by coupling a pair of stick-shaped frames 50 in the shape of the letter X, via a pin 51. The crossing members 52 are joined by coupling the tips of stick-shaped frames 50 with one another via pins 51. Also, the end parts of each crossing member 52 are classified into a fixed end part 52a, which is provided in a slide guide part 47a so as not to be able to move in left and right directions, and a movable end part 52b, which is provided in a slide guide part 47a so as to be slidable in left and right directions. The fixed end part 52a is positioned on the support frame part 47b side, and coupled with a slide guide part 47a, via a pin 51, in a rotatable manner. Also, the movable end part 52b is positioned on the opposite side of the support frame part 47b, and coupled with a slider 53 via a pin 51, in a rotatable manner. The slider 53 is a cylindrical member, and provided in the slide guide part 47a in an axially slidable manner.

The first water-stop sheet 41 is stretched between the first arch frames 42 located at both front and rear ends of the bellows part 69 and constitutes an outer skin for the bellows part 69. The first water-stop sheet 41 is a flexible sheet, made of resin. As shown in FIG. 4, the first water-stop sheet 41 is provided on the outside of each first arch frame 42, and is fastened to each first arch frame 42. Thereby, the first water-stop sheet 41 is deformed to expand and contract between the first arch frames 42.

Figure 10:
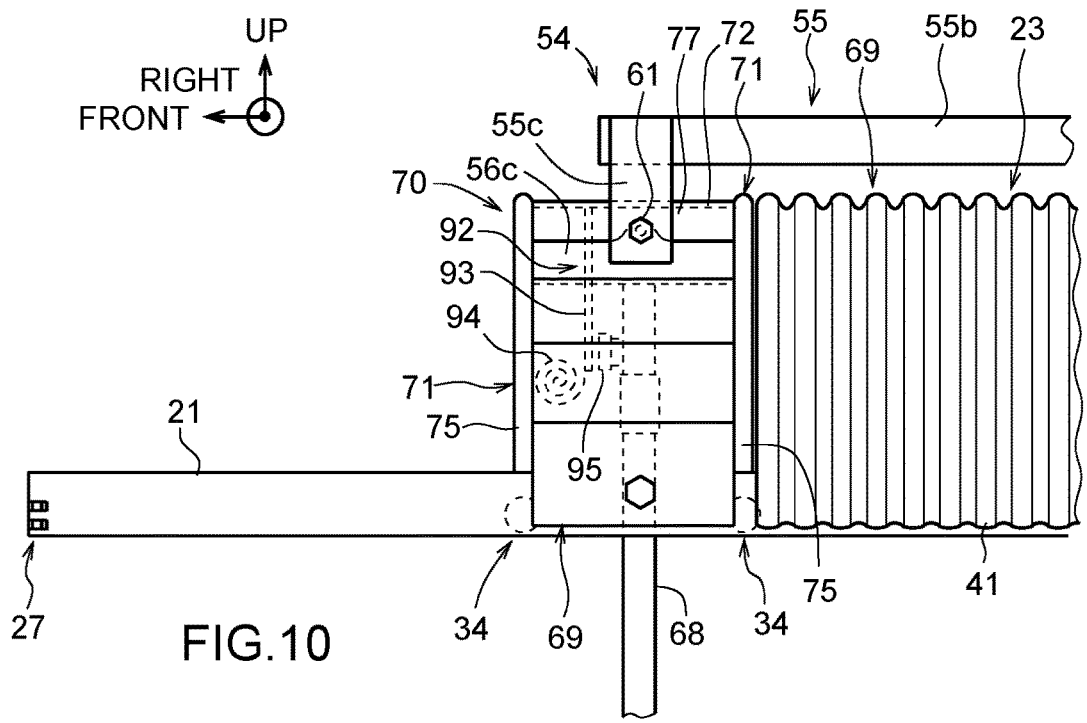
FIG. 10 is an enlarged view of a main part of FIG. 9.
Figure 11:
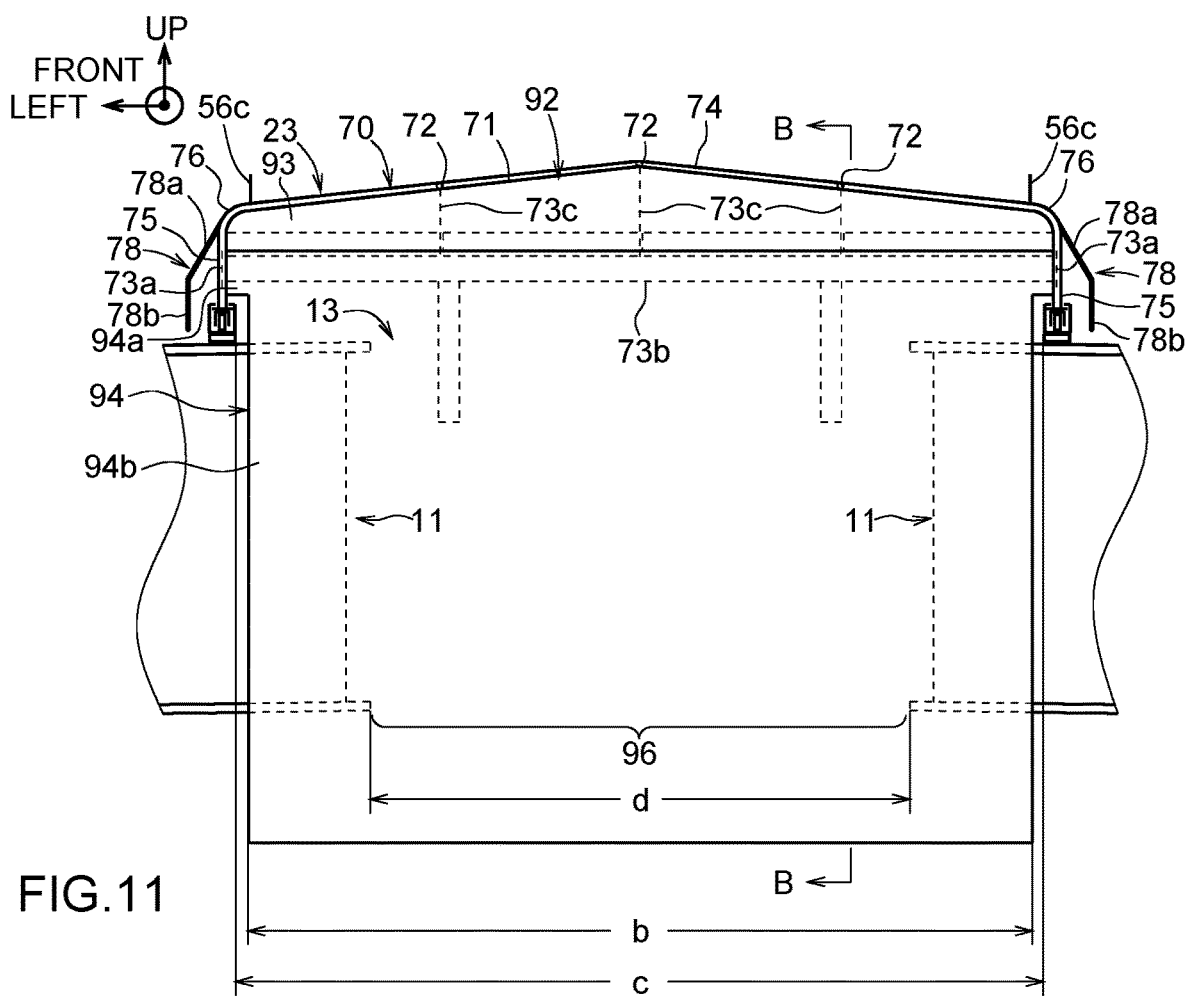
FIG. 11 is a front view of a lid member.
Figure 12:
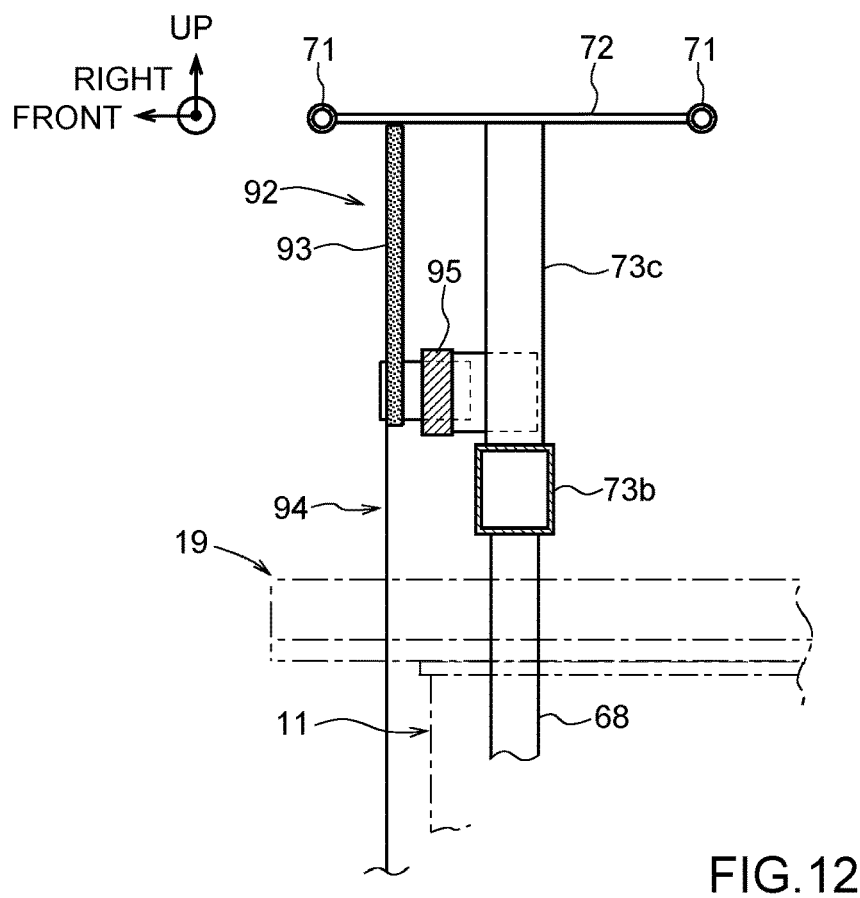
FIG. 12 is a cross-sectional view taken along line B-B in FIG. 11.

As shown in FIG. 2, the bellows support parts 70 are provided between frame structures 40 and at the end parts of the frame structures 40 in front and rear directions. As shown in FIG. 10, FIG. 11 and FIG. 12, Each bellows support part 70 has a pair of front and rear second arch frames 71, an intermediate frame 72 (see FIG. 12) connecting these second arch frames 71, a reinforcing frame part 73 for reinforcing the bellows support part 70, and a second water-stop sheet 77 stretched between the front and rear second arch frames 71.

The second arch frames 71 are formed in an arch shape extending in left and right directions, and arranged apart from each other in front and rear directions. The second arch frame 71 is formed in substantially the same shape as the first arch frame 42, and, furthermore, set in substantially the same outer dimensions in left and right directions and in front and rear directions. That is, the second arch frame 71 has a center frame part 74, which is formed in the center in left and right directions, and which extends along left and right directions, rising frame parts 75, which are formed in both the left and right end parts and extend in vertical directions, arc-shaped frame parts 76, which are formed in an arc shape and connect between the center frame part 74 and the rising frame parts 75.

Fixed casters 34 described above are provided at the lower end of the rising frame parts 75. Further, a back surface of the second water-stop sheet 77 is fixed to the central frame part 74. The second water-stop sheet 77 is made of water-impermeable material such as a water-repellent cloth or a resin. Further, the rising frame parts 75 is provided with a guide frame 78 that guides the second water-stop sheet 77 hanging downward from the arc-shaped frame part 76 outward (in a direction away from the hatch opening 13).

The guide frame 78 is formed to have a round cross section. The guide frame 78 has an inclined guide part 78a, which extends outward and obliquely downward from an upper part of the rising frame part 75, and a vertical guide part 78b, which extends vertically downward from the lower end of the inclined guide part 78a. The lowermost position of the vertical guide part 78b is set to substantially the same height as the lowermost position of the rail piece 21. The second water-stop sheet 77 is fastened to the lower end of the vertical guide part 78b. The second water-stop sheet 77 constitutes an outer skin for the bellows support part 70. The second water-stop sheet 77 is a flexible sheet, made of resin or the like. The second water-stop sheet 77 is provided on the outside of each second arch frame 71.

The intermediate frame 72 is formed in a shape of a round bar and extends in front and rear directions. A plurality of intermediate frames 72 are provided between the center frame parts 74 at intervals in left and right directions.

The reinforcing frame part 73 comprises a pair of side plate parts 73a arranged on left and right sides of the second arch frame 71, a reinforcing beam part 73b provided so as to span between the side plate parts 73a, and a plurality of suspension frames 73c provided between the intermediate frame 72 and the reinforcing beam part 73b to suspend the reinforcing beam part 73b.

The side plate part 73a is formed in a plate shape perpendicular to left and right directions, and is provided so as to span between the front and rear rising frame parts 75.

The reinforcing beam part 73b is formed in a rod shape extending in left and right directions and also in a rectangular cross section. A plurality of legs 68 extending downward are provided on the reinforcing beam part 73b so as to be separated from each other in left and right directions. When the chute unit 58 is placed on the ship such as the sliding hatch cover 11, the legs 68 are grounded on the ship. The suspension frame 73c is formed in a vertically long plate shape. Further, the suspension frame 73c is arranged so that plate surface faces left and right directions.

Furthermore, the bellows support part 70 is provided with a fastening bracket part 56c, which is fastened, in a disengageable manner, to a fastener 54, which will be described later.

Also, as shown in FIG. 8, FIG. 9 and FIG. 10, in the front end part and the rear end part of the on-board chute 22, fasteners 54 for holding the lid members 23 in a contracted state are provided. The fasteners 54 are provided symmetrically, with respect to the on-board chute 22, in front and rear directions. Consequently, the front fastener 54 alone will be described below, and the rear fastener 54 will be assigned the same reference numeral in the drawing, and the description thereof will be omitted. Also, the "front extending part 55b" to constitute the front fastener 54 will be read as a "rear extending part 55b" for the rear fastener 54.

The front fastener 54 is comprised of a pair of support rods 55, which are provided in the front end part of the traveling base part 33, and extend forward. To be more specific, a pair of support rods 55 are provided in the upper surface of the traveling base part 33, so as to be apart from each other left and right. Each support rod 55 has an upper extending part 55a, which is provided in the upper surface of the traveling base part 33 and extends upward, a front extending part 55b, which is bent from the upper end of the upper extending part 55a and extends forward, and a lower extending part 55c, which is provided in the front extending part 55b and extends downward. The upper extending part 55a extends up to a position higher than the lid member 23. The front extending part 55b is positioned above the lid member 23. The lower extending part 55c is formed in a plate shape. A pin hole (not shown) for inserting a pin 61 is formed in the lower extending part 55c. The pin hole is formed so as to extend in left and right directions. The lower extending part 55c is fastened to the fastening bracket part 56c with a pin 61 and a retainer (not shown), in a disengageable manner.

When transporting the on-board chute 22 between the quay 2 and the vessel, as shown in FIG. 8, the lid members 23 are retracted, and these retracted lid members 23 are fastened with fasteners 54, so that all of these, together with the rails 21, make up a unit (hereinafter referred to as the "chute unit 58").

As shown in FIG. 3 and FIG. 13, rail pieces 21 that are not incorporated in the chute unit 58 are made a unit consisting of a pair of left and right ones. To be more specific, left and right rail pieces 21 are joined via guard members 24 and beam frames 28. Each beam frame 28 has an upper step part 28a, which extends from the rising part 24b of the guard member 24 generally toward the center between the rail pieces 21, a lower extending part 28b, which extends downward from the tip of the upper step part 28a, and a lower step part 28c, which is formed between these lower extending parts 28b and extends in the horizontal direction. The proximal end of the upper step part 28a is connected with the rising part 24b of the guard member 24. When the rail pieces 21 are placed on the sliding hatch covers 11, the lower extending parts 28b and the lower step part 28c are positioned between the sliding hatch covers 11. In particular, the distance between the left and right extending parts 28b is set so that the left and right extending parts 28b are brought close to the opposing ends 12 of the sliding hatch covers 11 when the hatch opening 13 opens up at a given distance X, which is determined in advance. By this means, the positions of the rail pieces 21 in left and right directions are restricted, and, for example, even when the rail pieces 21 receive a force in left and right directions due to the wind or the like, the rail pieces 21 are prevented or restrained from shifting in left and right directions.

Also, a plurality of beam frames 28 are provided in left and right rail pieces 21, at intervals, in front and rear directions. A net 29 for preventing fall into the hold 7 is provided to stretch between beam frames 28 that are apart front and rear.

In this way, a ladder-shaped rail unit 30 is made up by joining left and right rail pieces 21 via beam frames 28.

Figure 5:
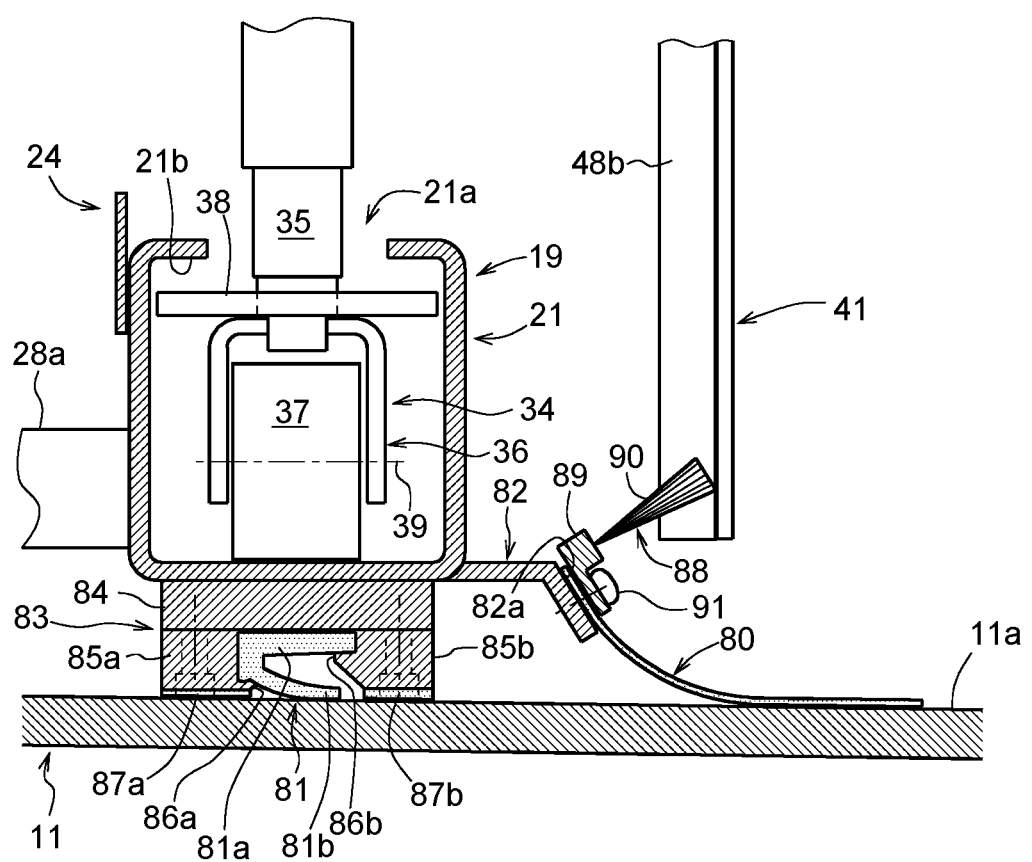
FIG. 5 is an enlarged view of a main part of FIG. 4.

Further, as shown in FIGS. 4 and 5, a water-blocking member 88 is provided between the first water-blocking sheet 41 and the rail 19.

The water-blocking member 88 is comprised of a brush and is supported by the rail 19. The water-blocking member 88 has a brush head 89, and bristles 90 planted on the brush head 89. The brush head 89 is formed to be long in front and rear directions, and is supported by the rail 19 via a bracket 82, which will be described later. The bristles 90 are formed of resin or the like. The bristles 90 are planted on the brush head 89 by bundling a plurality of bristles 90, and planted along the front and rear directions. Also, the bundle of bristles 90 is formed so as to spread from the brush head 89 toward the tip side. The tips of the bristles 90 are brought into contact with the inner surface of the first water-blocking sheet 41. The water-blocking member 88 is comprised of a brush and therefore air-permeable. By this means, the pressure in the hold 7 can be released.

Note that the water-blocking member 88 is not limited to a brush. The water-blocking member 88 should just be able to stop the water through the gap between the water-blocking sheet 41 and the rail 19. For example, the water-blocking member 88 may be comprised of a soft resin sheet, or a mesh-shaped soft resin sheet or the like.

Further, the rain-guard device for shipping 20 includes a first seal 80 and a second seal 81 for sealing between the rail 19 and the sliding hatch cover 11.

The first seal 80 is formed of a soft resin such as rubber into a sheet-like shape.

One end part of the first seal 80 is supported by the rail 19, and the other end part of the first seal 80 is brought into contact with the upper surface of the sliding hatch cover 11. To be more specific, the first seal 80 is supported by the rail 19 via a bracket 82. Even when the sliding hatch cover 11 is deformed, the blocking of water by the first seal 80 is ensured by appropriately selecting the ground contact length of the first seal 80 with respect to the sliding hatch cover 11.

The bracket 82 is formed so as to extend continuously in the direction the rail 19 (in front and rear directions) extends, and, furthermore, extends in the direction opposite to the hatch opening 13 (that is, extends outward in the widthwise direction of the lid member 23). Also, an inclined attachment surface 82a that is inclined obliquely downward is formed at the tip part of the bracket 82, and one end part of the first seal 80 is attached to the inclined attachment surface 82a. To be more specific, one end part of the first seal 80 is placed on top of the inclined attachment surface 82a, and bolted to the bracket 82 constituting the inclined attachment surface 82a, with a bolt 91. By this means, the first seal 80 is inclined obliquely downward from one end part toward the other end part, and the other end part of the first seal 80 is placed on top of and along the upper surface of the sliding hatch cover 11. Then, the middle part between one end part and the other end part of the first seal 80 is curved so as to allow the angle gap produced between one end part and the other end part.

By this means, a force is produced, in the direction to restore the shape of the first seal 80, in the middle part, and this force presses the other end part against the sliding hatch cover 11. Furthermore, in the bracket 82, the brush head 89 of the water-blocking member 88 is supported via one end part of the first seal 80. To be more specific, the brush head 89 is placed on top of one end part of the first seal 80, and bolted to the bracket 82, with a common bolt 91, together with one end part of the first seal 80. By this means, the water-blocking member 88 and the first seal 80 are connected so as to be continuous, so that water can be blocked in the range from the sliding hatch cover 11 to the water-blocking sheet 41.

Note that the other end part of the first seal 80 is placed on top of the upper surface of the sliding hatch cover 11, but this is by no means limiting. The other end part of the first seal 80 may be brought into contact with the upper surface of the sliding hatch cover 11. Also, although the inclined attachment surface 82a has been described to be formed in the bracket 82, but the inclined attachment surface 82a may be omitted. In this case, one end part of the first seal may be formed to bend with respect to the other end part.

Also, the lowermost position of the water-blocking member 88 and the uppermost position of the first seal 80 are set to substantially the same height as the lowermost position of the water-blocking sheet 41. By this means, the rainwater that flows on the sliding hatch cover 11 and the rainwater that falls between the sliding hatch cover 11 and the water-blocking sheet 41 can be blocked by the sheet-shaped first seal 80. Then, the rainwater that is blown up on the back side of the water-blocking sheet 41 by wind or the like can be blocked by the brush-shaped water-blocking member 88 while maintaining the air permeability.

Note that the lowermost position of the water-blocking member 88 and the uppermost position of the first seal 80 may be higher than the lowermost position of the water-blocking sheet 41. In this case, the upper end height and the inclination of the first seal 80 may be set so as not to contact the guide frame 48.

Also, a plurality of first seals 80 are placed side by side in front and rear directions so as to cover the entire length of the side surface of the seal holder 83. Note that the first seals 80 may be comprised of one sheet. In this case, the length of the first seals 80 in front and rear directions may be set to be the same as the seal holder 83 or longer than the seal holder 83.

The second seal 81 is comprised of a lip seal and is interposed between the rail piece 21 and the sliding hatch cover 11. The second seal 81 has a base part 81a, which is formed in a thick plate-like shape, and a lip part 81b, which extends obliquely downward from one side of the base part 81a toward the other side. The lip part 81b is formed in a tongue-like shape that is thinner than the base part 81a, and is set so that the dimension in the thickness direction becomes smaller from the base end toward the tip. The second seal 81 is placed so that the tip of the lip part 81b faces the direction opposite to the hatch opening 13 (the direction where rainwater is present).

Also, a seal holder 83 is provided at the bottom of the rail 19, and the second seal 81 is held by the seal holder 83. The seal holder 83 has an attaching base part 84, which is integrally attached to the rail 19, and a pair of leg parts 85a and 85b, which are provided on the bottom surface of the attaching base part 84 at intervals in left and right directions.

The attaching base part is formed in a plate-like shape that is long in front and rear directions. The leg parts 85a and 85b are placed on both the left and right sides of the second seal 81 in order to hold the second seal 81 from left and right. The leg parts 85a and 85b may be fastened to the attaching base part 84 with fasteners, such as bolts, in a detachable manner. The length of the leg parts 85a and 85b in front and rear directions is set to be the same as the length of the attaching base part 84 in front and rear directions.

Also, the leg parts 85a and 85b are provided with claws 86a and 86b for locking the second seal 81. The claw 86a formed in the leg part 85a of the hatch opening 13 side is engaged with the lower surface on the base end side of the lip part 81b. The claw 86b formed in the leg part 85b of the opposite side of the hatch opening 13 is engaged with the lower surface of the base part 81a.

Also, third seals 87a and 87b are provided on the bottom surfaces of the leg parts 85a and 85b. The third seals 87a and 87b are formed in a sheet-like shape, and provided over the entire length of the leg parts 85a and 85b.

Note that, if sufficient sealability can be achieved with the first seals 80 alone, the second seal 81 and the third seals 87a and 87b may be omitted.

By the way, the lid member 23 is formed in an arch-shaped cross section, and an end face opening is formed at an end part in front and rear directions. Therefore, it is conceivable that rainwater will enter the hatch opening 13 from the end face opening on the side opposite to the onboard chute 22.

Therefore, the bellows support part 70 forming the end part on the side opposite to the onboard chute 22 among the end parts of the lid member 23 is provided with a waterproof seal 92 for restraining water from seeping into the lid member 23.

The waterproof seal 92 is arranged at a position where it is covered from above by the second water-stop sheet 77, and is supported by the reinforcing frame part 73. The waterproof seal 92 includes a waterproof plate 93 that closes an upper part of the end face opening of the bellows support part 70, and a waterproof sheet 94 that closes the end face opening of the bellows support part 70 below the waterproof plate 93.

The waterproof plate 93 is made of a resin such as rubber having a self-supporting hardness, and is supported by the reinforcing frame part 73. Specifically, the suspension frame 73c constituting the reinforcing frame part 73 is provided with a rod-shaped mounting seat 95 extending in left and right directions so as to project on the side opposite to the onboard chute 22. A lower end of the waterproof plate 93 is attached to the mounting seat 95 at a position opposite to the onboard chute 22. Further, an upper end of the waterproof plate 93 is formed in a shape along the second water-stop sheet 77 and the intermediate frame 72, and is in contact with the second water-stop sheet 77 and the intermediate frame 72. As a result, wind and rain are restrained from entering the lid member 23 from between the second water-stop sheet 77 and the waterproof plate 93, and wind and rain are restrained from entering the lid member 23 from between the intermediate frame 72 and the waterproof plate 93. Note that material of the waterproof plate 93 is not limited to resin. The material of the waterproof plate 93 may be any material as long as it can restrain water from seeping into the lid member 23, and may be, for example, metal, wood, or the like.

The waterproof sheet 94 is made of a soft resin that can be wound, and is provided on the waterproof plate 93. Further, the waterproof sheet 94 is formed so as to extend downward from the rail 19. This is because, when the sliding hatch covers 11 are separated from each other to form the hatch opening 13, an opening (hereinafter, side opening 96) is formed also between the sliding hatch covers 11 below the rail 19 (between the front end faces of the sliding hatch covers 11, and between the rear end faces of the sliding hatch covers 11). By extending the waterproof sheet 94 below the rail 19, the side opening 96 can be closed, and it is possible to restrain water from seeping into the hold 7 from the side opening 96. Specifically, the waterproof sheet 94 includes a wide part 94a formed at a position above the rail 19, and a narrow part 94b formed at a position below the wide part 94a.

The wide part 94a is formed so as to have both left and right sides in contact with the side plate part 73a, and an upper end part is liquid-tightly attached to the waterproof plate 93. As a result, it is possible to restrain water from entering the lid member 23 inside the upper end part and both the left and right sides of the wide part 94a.

The width dimension b of the narrow part 94b is set to be smaller than the distance c between the left and right rails 19 and larger than the distance d between the sliding hatch covers 11. As a result, the narrow part 94b can cover the gap between the rails 19 without interfering with the rail 19. Further, a length of the narrow part 94b in the vertical direction is set so that the lower end of the narrow part 94b reaches lower position than the sliding hatch cover 11 when it is unfolded and hung down. As a result, the side opening 96 between the sliding hatch covers 11 is covered with the narrow part 94b of the waterproof sheet 94. Further, when the lid member 23 is retracted and unitized into the chute unit 58, the waterproof sheet 94 is rolled up and fastened by a fastener (not shown) so as to maintain the rolled shape. Further, the waterproof sheet 94 is arranged so that a base end position is offset into the lid member 23 so that the waterproof sheet 94 is accommodated in the bellows support part 70 when it is rolled up.

The mounting structure of the waterproof sheet 94 is not limited to the above. For example, the waterproof sheet 94 may be attached to the mounting seat 95. In this case, the waterproof sheet 94 and the waterproof plate 93 may be separated from each other in the vertical direction. In this case, it is preferable that the space between the waterproof sheet 94 and the waterproof plate 93 is liquid-tightly closed by the mounting seat 95.

Further, the mounting seat 95 may be provided on either the second arch frame 71 or the intermediate frame 72. Further, the mounting seat 95 may be omitted. In this case, for example, the waterproof plate 93 may be provided on any of the reinforcing frame part 73, the second arch frame 71, and the intermediate frame 72.

Next, effects of the present embodiment will be described below.

Figure 15:
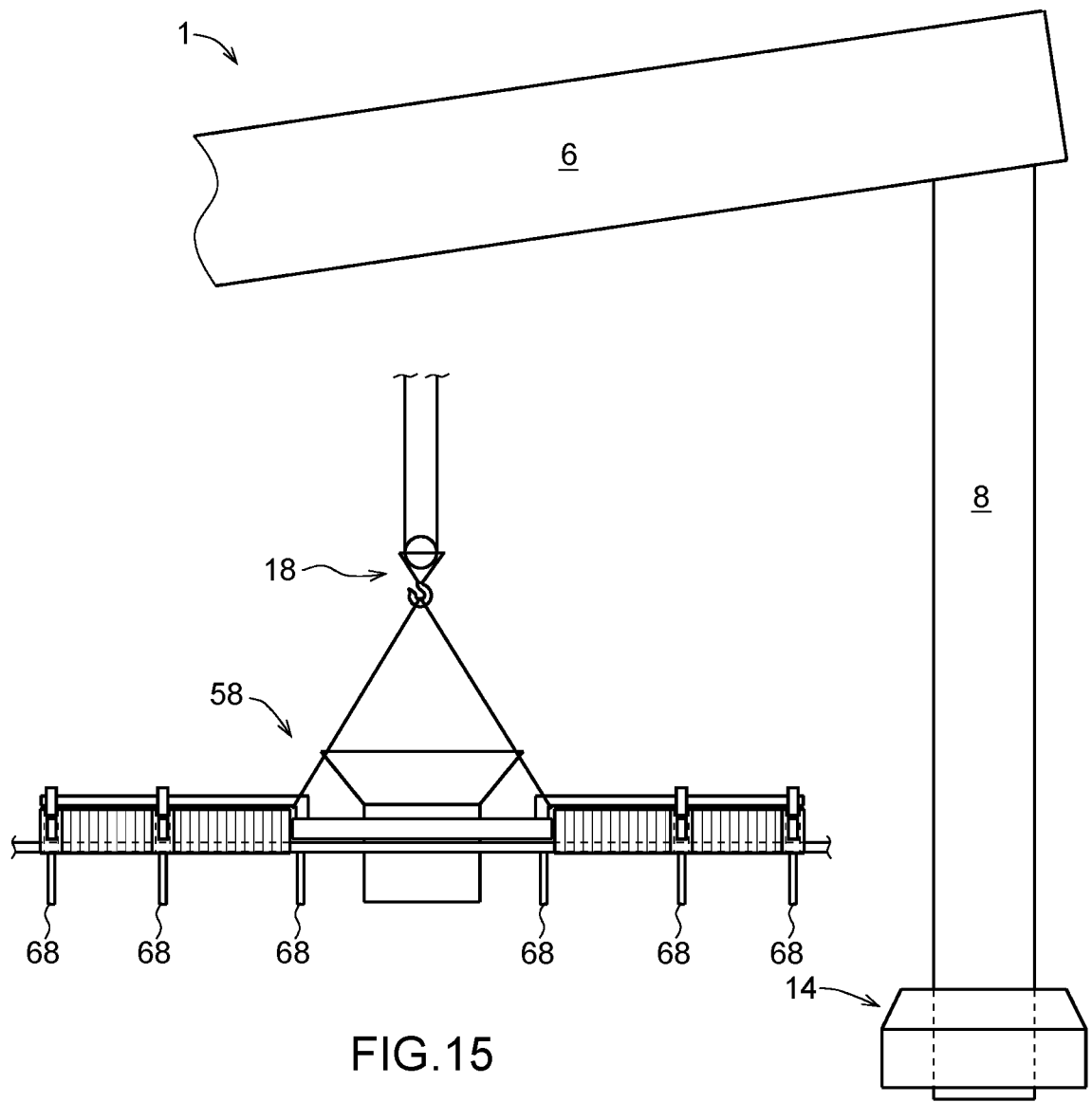
FIG. 15 is a side view of a chute unit in a hanging state.

When the rain-guard device 20 for shipping is installed in the vessel 9, as shown in FIG. 15, the unloading device 18 provided in the ship loader 1 is used to transport the chute unit 58 and the rail unit 30 from the quay 2, onto the vessel, on the sliding hatch covers 11, for example. At this time, the chute unit 58 contacts the grounds with legs 68 and stands by itself.

Then, the sliding hatch covers 11 are opened by a predetermined distance X, to form the hatch opening 13 between the sliding hatch covers 11. Here, the predetermined distance X is a dimension that is determined by the length of the beam frame 28, L1, and the length of the lower part 28c, L2, and is set to a dimension that is smaller than the length L2 of the beam frame 28 and larger than the length L1 of the lower part 28c. The predetermined distance X is 2 m, for example.

Figure 16:
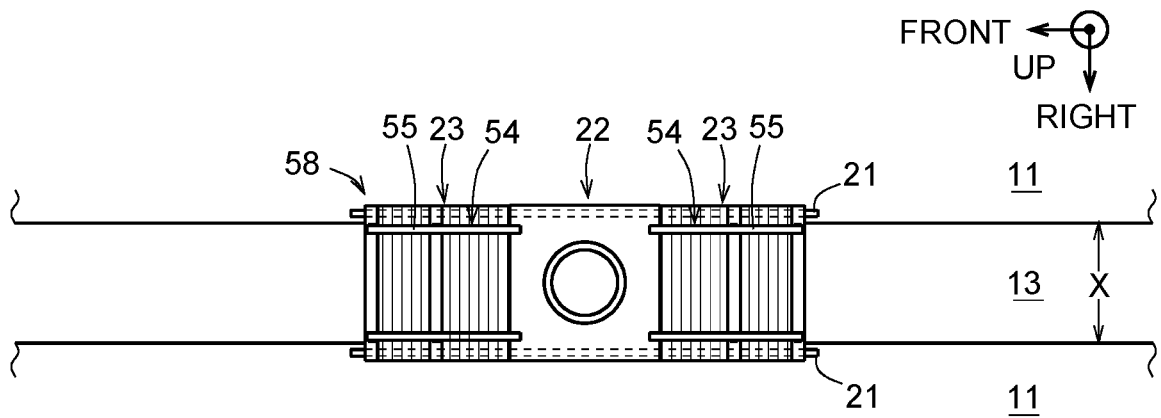
FIG. 16 is a top view showing a state in which a chute unit is placed on a sliding hatch cover.

Then, as shown in FIG. 16, the chute unit 58 is installed at the center of the hatch opening 13 in front and rear directions (longitudinal direction). At this time, the chute unit 58 is installed so that the left and right rail pieces 21 are both positioned on the sliding hatch covers 11.

Figure 17:
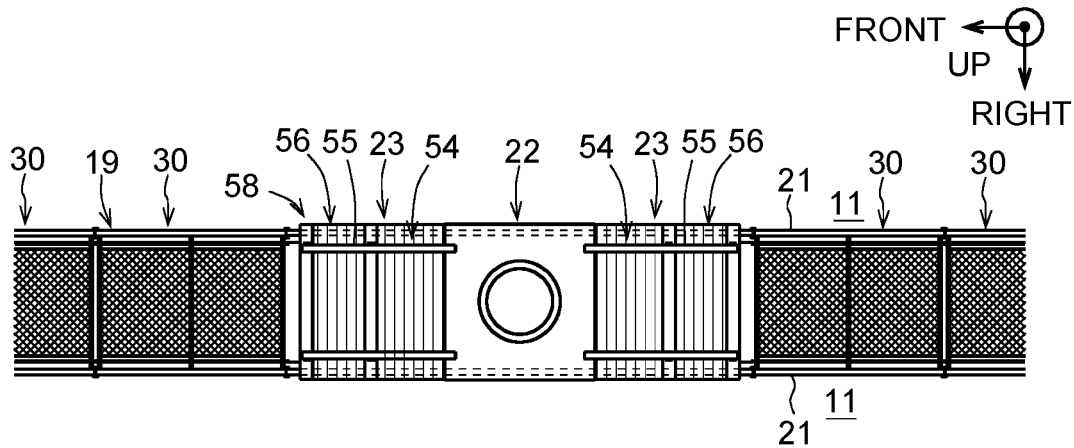
FIG. 17 is a top view showing a state in which a chute unit and a rail unit are placed on a sliding hatch cover.

After this, as shown in FIG. 17, the rail unit 30 is installed in the hatch opening 13 in front and rear of the chute unit 58. At this time, the female joining piece 27 (see FIG. 14) and the male joining piece 26 of neighboring rail units 30 are coupled with each other.

To be more specific, by inserting the joining pin 26b of the male joining piece 26 into the insertion hole 27b of the female joining piece 27, the female joining piece 27 and the male joining piece 26 are coupled. By this means, rail pieces 21 that neighbor each other in front and rear are fixed in a positioned state. Also, at this time, in each rail piece 21, a first seal 80 is fixed to via the bracket 82. Therefore, the chute unit 58 and the rail pieces 21 of the rail unit 30 are placed on the sliding hatch covers 11, so that the tip parts of the first seals 80 are placed on top of and pressed against the upper surface 11a of the sliding hatch cover 11. Consequently, even if the upper surface 11a of the sliding hatch cover 11 is deformed due to welding or the like and has bumps, it is possible to neutralize these bumps and block water. That is, even when the sliding hatch covers 11 are deformed due to welding or the like, it is possible to prevent or restrain the seeping of wind and water from outside the sliding hatch covers 11, by appropriately selecting the ground contact length of the first seal 80 with respect to the sliding hatch covers 11.

Following this, the pin 61 is removed from the lower extending part 55c and the fastening bracket part 56c shown in FIG. 10, to release the fixing of the lid member 23.

Figure 18:
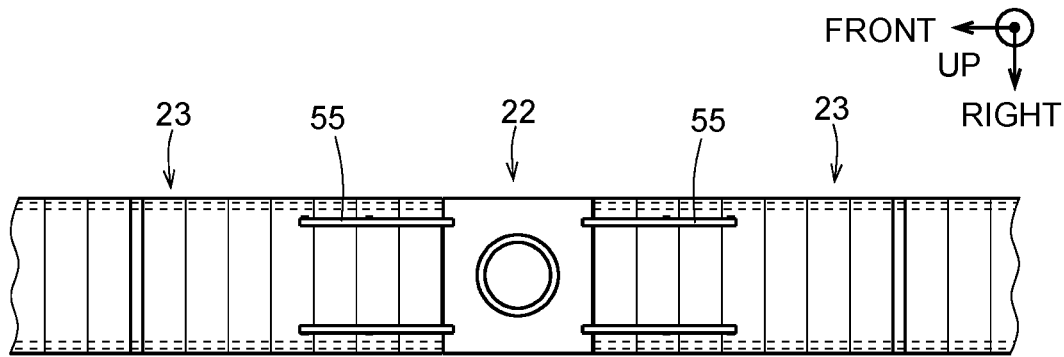
FIG. 18 is a top view showing a state in which a lid member of a chute unit is stretched.

Then, as shown in FIG. 18, each lid member 23 is expanded. When the lid members 23 are expanded to near the front and rear end parts of the hatch opening 13, the end parts of the lid members 23 are fixed to the rail pieces 21 with bolts or the like. By this means, the hatch opening 13 is closed, over its entire length, with the on-board chute 22 and the lid members 23. After that, the waterproof sheet 94 in a state of being rolled up and housed in the bellows support part 70 is unfolded and hung downward. As a result, the lid member 23 below the waterproof plate 93 is closed by the waterproof sheet 94, and the side opening 96 between the sliding hatch covers 11 is closed by the waterproof sheet 94. In this state, rain does not enter the hold 7 except for a part of the chute main body 32. The chute main body 32 may be provided with a lid (not shown) for closing an upper end opening thereof, if necessary.

Figure 19:
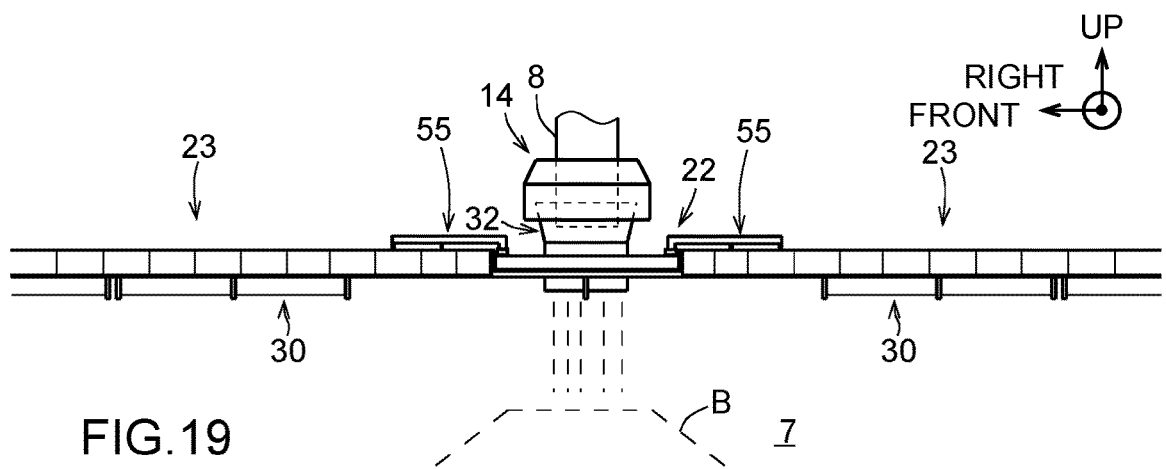
FIG. 19 is a side view showing a state in which cargo is loaded from an on-board chute into a hold.

Following this, as shown in FIG. 19, the chute part 8 of the shiploader 1 is inserted in the chute body part 32. After the chute part 8 of the shiploader 1 is inserted in the chute body part 32, the upper and side parts of the chute body part 32 are covered by the cover member 14.

Figure 20:
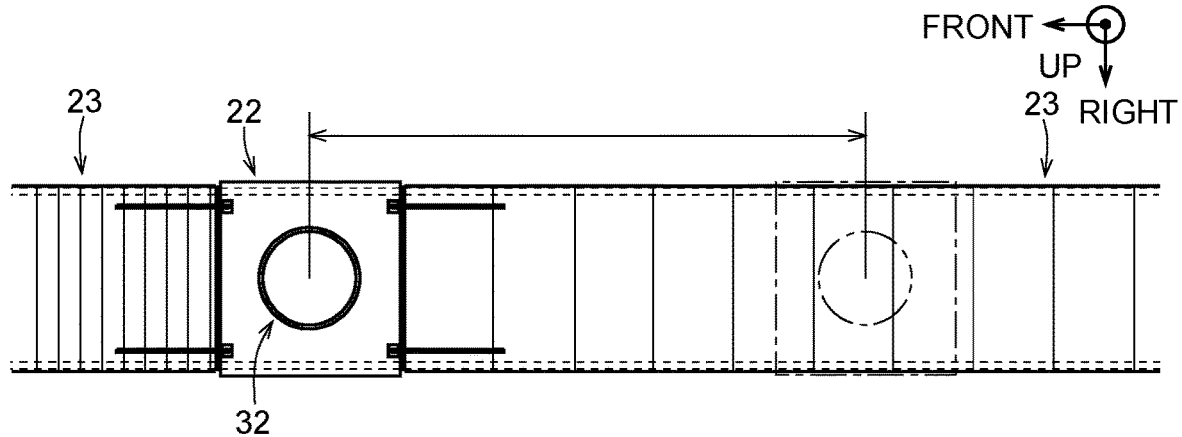
FIG. 20 is a top view showing a state in which an on-board chute is moved.
Figure 21:
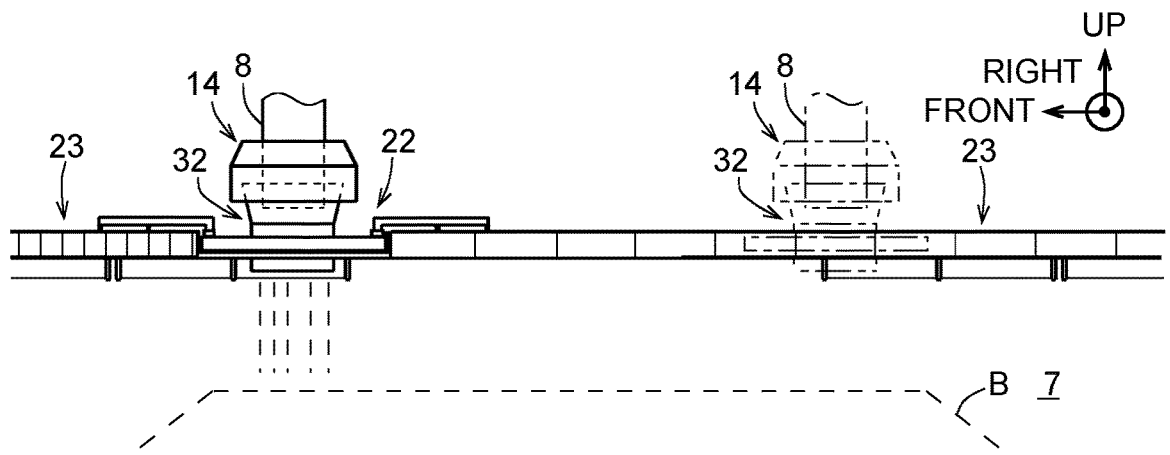
FIG. 21 is a side view showing a state in which cargo is loaded from an on-board chute that is moved, into a hold.

When cargo B is supplied in the hold 7, as shown in FIG. 20 and FIG. 21, cargo B is supplied from the chute part 8 of the ship loader 1 into the chute body part 32, and, meanwhile, the ship loader 1 is allowed travel appropriately in front and rear directions. At this time, the lid members 23 expand and contract as the on-board chute 22 travels.

Therefore, even if the on-board chute 22 travels, the hatch opening 13 is not opened. Also, as the on-board chute 22 travels, the loading position of cargo B moves forward and backward, so that it is possible to disperse cargo B in front and rear directions in the hold 7, and load cargo B with a high filling rate. Note that the one-dot chain lines in the drawing show the rearmost position when the on-board chute 22 travels backward. The range in which the on-board chute 22 can travel is determined by the longest length and the shortest length of the lid members 23 as expanded and contracted.

If the opening between the sliding hatch covers 11 is airtightly and fixedly closed, pressure inside the hold 7 rises by supplying the load B into the hold 7, and an upward force acts on the rain-guard device 20 for shipping. In this case, it is conceivable that the rain-guard device 20 for shipping partially floats and moves unstably, and rainwater enter between the sliding hatch covers 11.

However, in the present embodiment, the water-blocking member 88 is breathable, and the side opening 96 between the sliding hatch covers 11 is closed by the waterproof sheet 94 hanging from above. Therefore, even if the pressure inside the hold 7 rises above the outside air, the pressure can escape through the water-blocking member 88 and can escape by pushing away the waterproof sheet 94. Therefore, it is possible to suppress an increase in pressure in the hold 7 when the load B is supplied into the hold 7, and it is possible to stably prevent or suppress water from seeping from between the sliding hatch covers 11.

Also, when loading cargo in the wind and rain, the water-blocking member 88, the first seal 80, the second seal 81, and the third seals 87a and 87b prevent or restrain water from seeping from left and right of the lid member 23. To be more specific, the water-blocking member 88 and the first seal 80 stop the rainwater from seeping in, outside the left and right rails 19. Also, when the first seal 80 receives wind from the outer side in the width direction of the lid member 23, the first seal 80 is more strongly pressed against the sliding hatch cover 11 due to the force of the wind, and guides the wind upward. Therefore, it is possible to effectively prevent or restrain the rainwater on the wind from reaching the rails 19. Furthermore, the wind passes between the bristles 90 of the water-blocking member 88 when flowing upward, and the rainwater contacting the bristles 90 is separated from the wind. Therefore, it is possible to prevent the rainwater from reaching the space on the hatch opening 13 side beyond the water-blocking member 88. Also, the wind having passed through the water-blocking member 88 passes through the other water-blocking member 88 again, and flows out of the bellows part 69.

Also, when rainwater passes the first seal 80 and seeps into the rail 19 side, the second seal 81 stops the rainwater right below the rail 19. The second seal 81 is comprised of a lip seal, and receives the weight of the on-board chute 22 and the lid member 23, and is pressed against the sliding hatch cover 11. Therefore, the second seal 81 is pressed against the sliding hatch cover 11 with a relatively strong force, and can stop seeping of rainwater effectively. Also, if bumps exist right below the rail 19, the third seals 87a and 87b are deformed to match these bumps. Therefore, it is possible to neutralize part or all of the height of the bumps, and improve the water blocking effect of the second seal 81. Also, the third seals 87a and 87b block water on both the left and right sides of the second seal 81.

Consequently, three layers of seals are provided along the direction where rainwater might seep in, and the water-blocking effect can be improved.

Further, the waterproof seal 92 prevents or restrains water from seeping from the front and rear directions of the lid member 23. Specifically, the waterproof plate 93 of the waterproof seal 92 restrains water from seeping from the upper end of the lid member 23 on the side opposite to the onboard chute 22. The waterproof sheet 94 of the waterproof seal 92 restrains water from seeping from the lid member 23 below the waterproof plate 93, and also restrains water from seeping from the side opening 96 between the sliding hatch covers 11.

Although an embodiment of present disclosure has been described above in detail, the present disclosure is also capable of other embodiments such as the following:

(1) The bellows support part 70 is arranged at the end of the lid member 23 on the side opposite to the onboard chute 22, but is not limited to this. For example, the lid member 23 may consist of a single bellows part 69. In this case, the waterproof seal 92 may be provided on the bellows part 69. Further, in this case, the waterproof seal 92 may be arranged at a position where it is covered by the first waterproof sheet 41 from above.

(2) The waterproof seal 92 includes the waterproof plate 93 and the waterproof sheet 94, but is not limited to. For example, the waterproof seal 92 may be comprised of the waterproof sheet 94 only. In this case, the waterproof sheet 94 may be formed so as to also close an upper part of the lid member 23.

(3) The water-blocking member 88 may be provided directly on the rail piece 21.

(4) Further, if the sealing property between the sliding hatch cover 11 and the rail 19 can be sufficiently secured by the second seal 81 and the third seals 87a and 87b, the first seal 80 may be omitted.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A rain-guard device for shipping, comprising:
a rail, which is placed on a sliding hatch cover that opens and closes an upper opening of a hold;
an on-board chute, which is provided in the rail in a travelable manner, which covers part of a hatch opening that is formed when the sliding hatch cover opens, and which, furthermore, supplies cargo from a shiploader into the hold; and
a lid member, which is placed in both front and rear in a traveling direction of the on-board chute, and which is configured to expand and contract as the on-board chute travels, in order to cover the rest of the hatch opening;
wherein the lid member is formed in an arch shape in cross section,
a waterproof seal for restraining water from seeping into the lid member is provided at an end part of the lid member opposite to the on-board chute among end parts of the lid member, and
the waterproof seal includes a waterproof plate that closes an upper part of an end face opening of the lid member, and a waterproof sheet that closes the end face opening below the waterproof plate.

2. The rain-guard device for shipping according to claim 1, wherein:
the waterproof sheet extends downward from the rail so as to cover a side opening between the sliding hatch covers.

3. The rain-guard device for shipping according to claim 1, wherein:
the waterproof seal is arranged at a position where the waterproof seal is covered from above by the waterproof sheet.

4. The rain-guard device for shipping according to claim 2, wherein:
the waterproof seal is arranged at a position where the waterproof seal is covered from above by the waterproof sheet.

5. A rain-guard device for shipping, comprising:
a rail, which is placed on a sliding hatch cover that opens and closes an upper opening of a hold;
an on-board chute, which is provided in the rail in a travelable manner, which covers part of a hatch opening that is formed when the sliding hatch cover opens, and which, furthermore, supplies cargo from a shiploader into the hold; and
a lid member, which is placed in both front and rear in a traveling direction of the on-board chute, and which is configured to expand and contract as the on-board chute travels, in order to cover the rest of the hatch opening;
wherein the lid member is formed in an arch shape in cross section,
a waterproof seal for restraining water from seeping into the lid member is provided at an end part of the lid member opposite to the on-board chute among end parts of the lid member, and
wherein the waterproof sheet extends downward from the rail so as to cover a side opening between the sliding hatch covers.

6. The rain-guard device for shipping according to claim 5, wherein:
the waterproof seal is arranged at a position where the waterproof seal is covered from above by the waterproof sheet.

7. A rain-guard device for shipping, comprising:
a rail, which is placed on a sliding hatch cover that opens and closes an upper opening of a hold;
an on-board chute, which is provided in the rail in a travelable manner, which covers part of a hatch opening that is formed when the sliding hatch cover opens, and which, furthermore, supplies cargo from a shiploader into the hold; and
a lid member, which is placed in both front and rear in a traveling direction of the on-board chute, and which is configured to expand and contract as the on-board chute travels, in order to cover the rest of the hatch opening;
wherein the lid member is formed in an arch shape in cross section,
a waterproof seal for restraining water from seeping into the lid member is provided at an end part of the lid member opposite to the on-board chute among end parts of the lid member, and
wherein the waterproof seal is arranged at a position where the waterproof seal is covered from above by the waterproof sheet.

* * * * *